United States Patent [19]

Winter

[11] 4,320,930
[45] Mar. 23, 1982

[54] AXIAL ROLLER BEARING FOR ROLLING MILLS
[75] Inventor: Heinrich Winter, Schweinfurt, Fed. Rep. of Germany
[73] Assignee: SKF Kugellagerfabriken GmbH, Schweinfurt, Fed. Rep. of Germany
[21] Appl. No.: 155,297
[22] Filed: Jun. 2, 1980
[30] Foreign Application Priority Data
Jun. 30, 1979 [DE] Fed. Rep. of Germany ... 7918792[U]
[51] Int. Cl.³ .............................................. F16C 19/30
[52] U.S. Cl. .................................... 308/234; 308/235
[58] Field of Search ............... 308/231, 222, 228, 219, 308/236, DIG. 11, 232, 234, 235

[56] References Cited
U.S. PATENT DOCUMENTS
2,959,458 11/1960 Kaye ..................................... 308/231
3,409,338 11/1968 Root et al. ........................... 308/231
4,239,305 12/1980 Baron ................................... 308/222

Primary Examiner—Lenard A. Footland
Attorney, Agent, or Firm—Eugene E. Renz, Jr.

[57] ABSTRACT

An axial roller bearing assembly adapted for rolling mills comprising at least one pair of flat bearing discs having confronting raceway surfaces, means defining an annular pocket in one of the edges of the bearing disc members having a radial surface, a plurality of rollers in the space between the raceway surfaces, a cage for the rollers comprising a base plate confronting one axial end face of the rollers, a plurality of spaced projections defining roller pockets and a locking ring connected to the outer terminal ends of said projections having a ring shaped extension which projects axially on the side facing one of said bearing disc members beyond the base plate and rests with a front surface on said radial surface.

4 Claims, 1 Drawing Figure

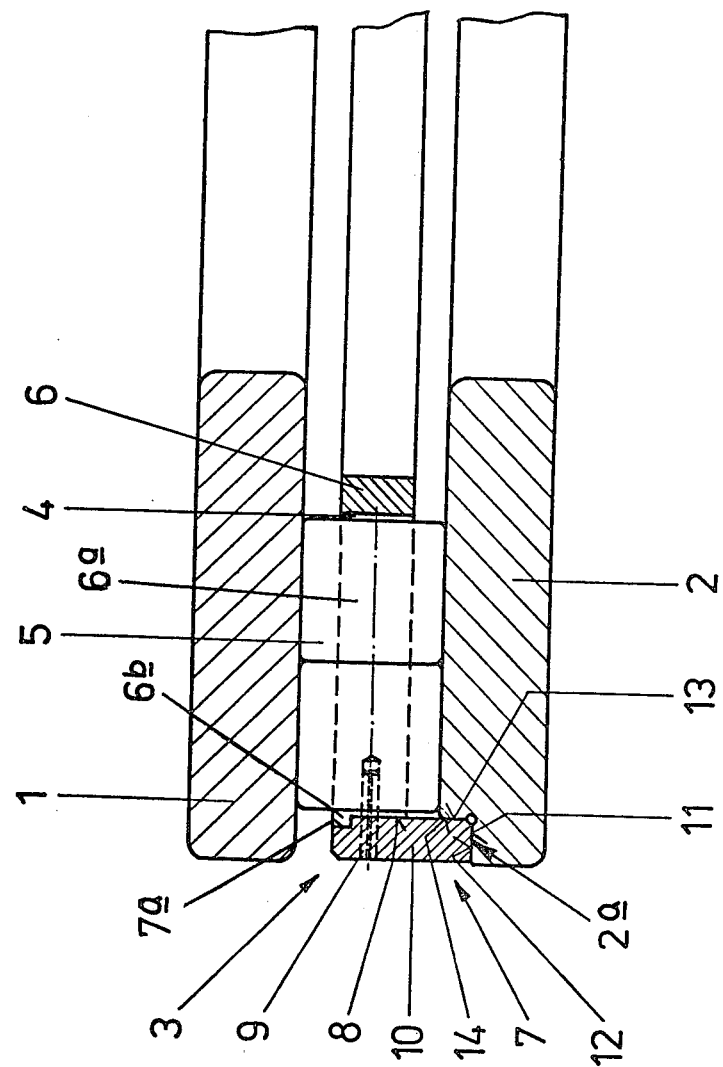

AXIAL ROLLER BEARING FOR ROLLING MILLS

BACKGROUND OF THE INVENTION

The present invention relates to an axial roller bearing particularly adapted for use in rolling mills which comprises a pair of flat bearing discs and a plurality of rollers in the annular space between the discs supported in a cage consisting of a cage base plate and a locking ring.

Bearings of this general construction are not new per se. However, in the prior bearings, the cage is guided in an axial direction on the rolling surfaces of the bearing discs. It has been observed, however, that the cage friction generated in these assemblies during operation produces a rapid wear of the bearing parts. An additional disadvantage in these known prior bearing assemblies is that the cage is only guided in one direction and additional means must be provided for guiding the cage in an axial direction.

There are also prior assemblies wherein the cage includes an integrated flange at the outside edge to fix the rolling elements in the cage pockets and additionally to provide a support or holding ring which rests against the outside surface of one of the bearing discs. This assembly, however, is relatively complicated and, therefore, rather expensive to manufacture.

SUMMARY OF THE INVENTION

With the foregoing in mind, an object of the present invention is to provide an axial bearing of the type described above which is characterized by novel features of construction and arrangement providing guidance of the cage in both an axial and a radial direction. Furthermore, the guiding contact areas are located remote from the raceway or rolling surfaces of the rings so that the wear particles generated cannot reach the rolling surfaces. It is a further object of the present invention to provide an axial bearing which is of rather simplified design which is economical to manufacture and can be assembled very easily. To this end, in accordance with the illustrated embodiment of the invention, one of the bearing discs is provided with a circumferentially extending recess or pocket at its outer peripheral edge adjacent to and outboard of the raceway or rolling surface. The cage includes a locking ring which engages in the annular pocket to guide the cage both axially and radially. The annular pocket is preferably formed in the bearing disc which is at the bottom of the cavity in which the bearing is mounted during installation. This arrangement produces not only a good and wear-free guiding of the cage but it has also been observed that the arrangement serves to retain lubricant in the bearing more effectively. The construction retards the loss of lubricant in prior assemblies of this type which is slung out of the bearing as the result of the forwarding effect of the cage.

BRIEF DESCRIPTION OF THE DRAWING

These and other objects of the present invention and the various features and details of the operation and construction thereof are hereinafter more fully set forth with reference to the accompanying drawing, wherein:

The FIGURE is a fragmentary transverse sectional view of an axial roller bearing in accordance with the present invention.

DESCRIPTION OF THE PREFERRED EMBODIMENT

Referring now to the drawing, the axial roller bearing of the present invention comprises an upper bearing disc 1, a lower bearing disc 2, a cage 3 having a plurality of circumferentially spaced cage pockets for a plurality of rollers 5 arranged between the raceways or rolling surfaces of the bearing discs 1 and 2. The cage 3, which is of generally L-shaped cross section, comprises an annular base plate 6 which may be made, for example, of brass or cast iron with graphite and a plurality of circumferentially spaced cross pieces or webs $6^a$ which project radially outwardly from the annular base plate 6 to define the cage pockets 4. The cage assembly further includes an annular locking ring 7 secured to the outer terminal ends of the webs or cross pieces 6 by suitable locking means such as pins 9. The locking ring 7 which may be made for example, of high quality friction bearing bronze includes an axially directed extended flange portion 10 which projects axially on the side facing the lower bearing disc 2 beyond the lower edge of the plane of the base plate 6 and nests in an annular pocket $2^a$ formed in the outer peripheral edge corner of the lower bearing disc 2. The locking ring 7, therefore, rests with its front surface 11 on the radial surface 12 of the pocket in the outside edge of the lower bearing disc to guide the cage in an axial direction. The cage 3 is also guided in the radial direction by the inner axial machined surface 13 of the lock ring which rests with play against the axially directed surface 14 of the pocket.

Parts of the cage are easy and economical to manufacture. Note that the locking ring 7 has an offset recess $7^a$ and the webs or cross pieces $6^a$ have a complementary projection $6^b$ to locate the locking ring 7 in the precise desired position relative to the cross pieces and base plate 6. The bearing assembly is easy to assemble. With the disc-shaped base plate 6 in place, the rollers are simply inserted into the pockets from outside the discs. The locking ring 7 is then secured to the outside surface of the base plate and secured in place by the pins 9.

While a particular embodiment of the present invention has been illustrated and described herein, it is not intended to limit the invention and changes and modifications may be made therein within the scope of the following claims. For example, cage pockets can be incorporated radially from the inside and the locking ring can be secured in the bore of the base plate 6. In this case, the annular pocket or recess for the locking ring is arranged on the inside edge of the bearing disc. Furthermore, the base plate can be made from various metals. It can also be made of plastic and the locking ring of metal.

What is claimed is:

1. An axial roller bearing assembly comprising at least one pair of annular disc members having confronting raceway surfaces, means defining an annular pocket in an edge of one of the annular disc members having a radial surface, a plurality of rollers in the space between the raceway surfaces, a cage for the rollers comprising a base plate confronting one axial end face of the rollers, a plurality of spaced projections defining roller pockets and a locking ring connected to the outer terminal ends of said projections having a ring shaped extension which projects axially on the side facing said one bearing disc member beyond the base plate and rests with a front surface on said radial surface.

2. An axial roller bearing assembly as claimed in claim 1 wherein said annular recess includes an axially directed surface and wherein a surface of said ring shaped extension of said locking ring rests with play against said axially directed surface of said pocket.

3. An axial roller bearing assembly as claimed in claim 1 wherein said recess is disposed in an edge of said one annular disc member located radially inwardly of said rollers.

4. An axial roller bearing assembly as claimed in claim 1 wherein said recess is disposed in an edge of said one annular disc member located radially outwardly of said rollers.

* * * * *